Patented Dec. 5, 1950

2,532,395

UNITED STATES PATENT OFFICE 2,532,395

CORD

Camille Dreyfus, New York, N. Y.

No Drawing. Application February 4, 1947,
Serial No. 726,447

2 Claims. (Cl. 57—140)

This invention relates to pneumatic tires and relates more particularly to improved cords adapted to be employed in the construction of pneumatic tires for motor vehicles and the like.

An object of my invention is the provision of novel tire cords for use in the construction of pneumatic tires, which cords not only exhibit excellent strength but, in addition, possess substantially improved heat conductivity.

Other objects of my invention will appear from the following detailed description.

Pneumatic tires are built of a series of sheets of parallel cords. These sheets are usually free of cross-threads but may contain a relatively light filler yarn to hold the cords together in parallel relationship. The sheets of parallel cords are first coated with rubber or other adhesive and then assembled on a building machine where the tire casing is built up. During this operation the bead wires which hold the finished tire on the wheel rim are enclosed. The rubberized sheets are associated in the form of chafing strips, plies, breaker strips, etc. and the whole assembly is then covered with rubber to form the tread and side-walls. After the assembly has been completed the whole is placed in a heated mold and the rubber covering is vulcanized therein to mold the patterned tread and to give the tire its final tough, durable and flexible form.

The cords employed in forming the tire carcass usually have a basis of a filamentary textile material and are commonly formed of materials such as regenerated cellulose produced either by the viscose process or by the saponification of organic acid ester of cellulose yarns, or of filaments of cotton, nylon or glass. Each of these materials possesses the necessary combination of properties to render them satisfactory as tire cord material at least to some degree. However, it has been observed that the use of these materials is limited due to the fact that they possess very low thermal conductivity. Thus, the heat generated in service, especially in heavy duty truck tires, is frequently excessive since it is not removed rapidly enough and this excessive heat deleteriously affects the life of the tire.

I have now found that tire cords of substantially improved heat conductivity and strength may be obtained if said tire cord is formed of one or more fine steel filaments in association with a textile material such as cotton, regenerated celloluse, nylon or glass fibers. The tire cords thus obtained not only exhibit the desirable characteristics of tire cords formed wholly of these textile materials but, in addition, they possess a considerably greater thermal conductivity. This increased thermal conductivity enables the heat generated in service to be dissipated more rapidly and, therefore, excessive local heating is avoided and a consequent shortening of the service life of the tire is thereby overcome.

The steel filaments may be associated with the textile materials heretofore mentioned in numerous ways to form the final tire cord. Thus, one or more steel filaments may be plied, cabled, braided, or wrapped with one or more yarns having a basis of cotton, regenerated cellulose, nylon, glass and the like. Very satisfactory results are obtained when the tire cord comprises a plurality of said textile materials associated with one or more steel filaments. Thus, for example, a cotton yarn may be plied with a steel filament and the resulting plied yarn then cabled with a plied yarn formed of nylon and regenerated cellulose filaments. On the other hand, the tire cord may be formed by braiding a cotton, regenerated cellulose and steel filament together. Where a heavier tire cord is desired the braided cords may then be plied and cabled. Any combination may be chosen depending upon the properties desired, the greater the number of steel filaments present, the higher the heat conductivity. Optimum results are obtained where the steel filaments comprise 10 to 20%, or even as much as 40%, by weight of the tire cord. For better adhesion to the rubber forming the remainder of the tire carcass, the steel filaments are preferably brass coated.

In order further to illustrate my invention but without being limited thereto, the following example is given:

Example

Two ends of a regenerated cellulose yarn of 270 denier, produced by the viscose process and having a twist of about 5 turns per inch, are plied with two ends of a steel monofilament 0.004 inch in diameter to give 14 turns per inch Z-twist. Three ends of the plied yarn are then cabled 12 turns per inch S-twist to form a cable suitable for use as a cord for tire manufacture. The resulting tire cord is found to have excellent heat conductivity. A cotton, nylon or glass yarn may replace one or both of the regenerated cellulose yarns forming the cord.

It is to be understood that the foregoing detailed description is given merely by way of illustration and that many variations may be made therein without departing from the spirit of my invention, Having described my invention, what I desire to secure by Letters Patent is:

1. A tire cord comprising a cabled structure containing two ends of plied yarn, one end of which comprises a cotton yarn plied with a steel filament, and the other end of which comprises a nylon yarn plied with a regenerative cellulose yarn.

2. A tire cord comprising a cabled structure containing two ends of plied yarn, one end of which comprises a cotton yarn plied with a steel filament, and the other end of which comprises a nylon yarn plied with a regenerated cellulose yarn, the steel filament comprising from 10 to 40% by weight of the tire cord.

CAMILLE DREYFUS.

REFERENCES CITED

The following references are of record in the file of this patent:

UNITED STATES PATENTS

| Number | Name | Date |
|---|---|---|
| 702,725 | Hammesfahr | June 17, 1902 |
| 1,407,378 | Callaghan et al. | Feb. 21, 1922 |
| 1,897,224 | Andrews | Feb. 14, 1933 |
| 2,067,405 | Mayne | Jan. 12, 1937 |
| 2,120,270 | Tucker | June 14, 1938 |
| 2,221,453 | Miller | Nov. 12, 1940 |
| 2,306,781 | Francis, Jr. | Dec. 29, 1942 |

FOREIGN PATENTS

| Number | Country | Date |
|---|---|---|
| 136,887 | Switzerland | Nov. 21, 1928 |